F. S. SPENCER & F. J. R. LENTZSCH.
HEN'S NEST.
APPLICATION FILED MAY 27, 1916.
1,201,773.
Patented Oct. 17, 1916.
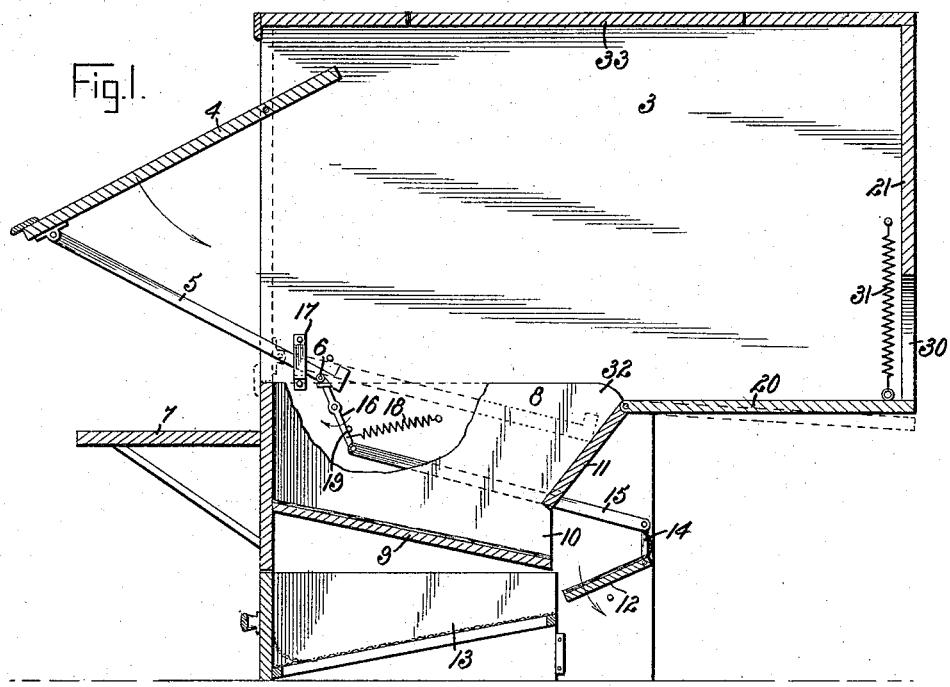
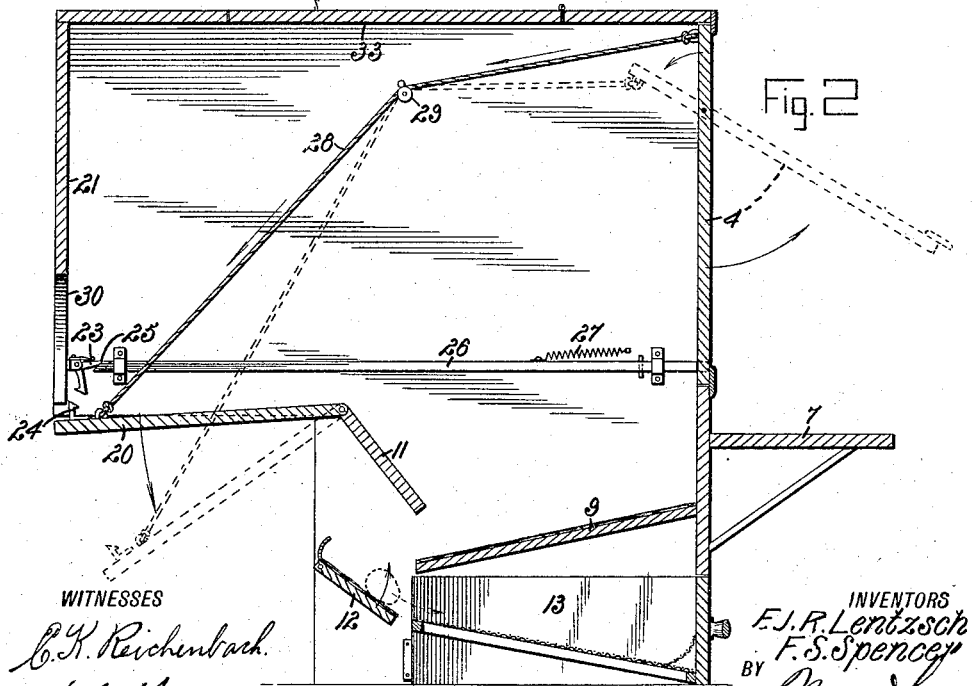
WITNESSES
INVENTORS
F.J.R. Lentzsch
F.S. Spencer
BY
ATTORNEYS

UNITED STATES PATENT OFFICE.

FREDERICK S. SPENCER AND FERDINAND J. R. LENTZSCH, OF NEW YORK, N. Y.

HEN'S NEST.

1,201,773.   Specification of Letters Patent.   Patented Oct. 17, 1916.

Application filed May 27, 1916. Serial No. 100,223.

*To all whom it may concern:*

Be it known that we, FREDERICK S. SPENCER and FERDINAND J. R. LENTZSCH, citizens of the United States, and residents of the city of New York, borough of Brooklyn, in the county of Kings and State of New York, have invented a new and Improved Hen's Nest, of which the following is a full, clear, and exact description.
Our invention relates to hens' nests adapted to trap the hen.

An object thereof is to provide a simple, inexpensive and sanitary nest which contains few movable parts and, therefore, is not apt to get out of order, and which resets automatically after it is once set.

Another object of the invention is to provide a nest of the class described in which the hen is not trapped until an egg has been laid.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in both views.

Figure 1 is a longitudinal section through a nest embodying our invention, the nest being set to admit a hen; and Fig. 2 is a similar section seen from the opposite side, the full line in said section showing the position of the nest when an egg has been laid, the dotted line in said figure indicating the resetting of the device when the hen passes out of the nest.
Referring to the drawings, 3 is the nest housing which has a gravitationally-operable entrance door or wall 4. A brace 5 is pivoted to one of the lower corners of the door 4. The brace extends into the housing to engage a stop 6 projecting from the adjacent side of the housing 3. The engagement of the stop with the brace prevents gravity from swinging the entrance door 4 to its closed position. A front platform 7 is preferably provided below the opening to facilitate the entrance of the hen through the opening into the nest 8 of the housing. The padded bottom 9 of the nest is set sufficiently below the lower edge of the front opening to accommodate a hen. It is inclined from the front to facilitate the rolling of an egg deposited thereupon toward an opening 10 formed in the end wall 11 of the nest. This wall is preferably inclined to better accommodate a hen.

A padded baffle plate 12 is mounted to swing between the depending sides of the housing at the opening 10 in the nest to receive an egg coming through said opening. The baffle is inclined toward a draw 13, preferably located below the bottom 9 of the nest, to direct the egg falling upon the baffle into said draw. An arm 14 is secured to the baffle to participate in the swinging movement thereof. A link 15 connects the arm 14 to a trip 16 which engages the brace 5 at the stop 6. The weight of an egg falling upon the baffle 12 causes the same to swing toward the bottom of the draw and move the trip, which raises the brace 5 from the stop 6 and gravity swings the entrance door 4 to its closed position as shown in dotted line in Fig. 1, the brace 5 being guided in its movement by a member 17. The egg which has fallen upon the baffle rolls off on to the bottom of the draw 13. The baffle 12 is restored to its normal position by a spring 18 which slightly overbalances the baffle 12 and the connection thereof with the trip. The spring is preferably connected to the trip 16 to draw the same against a stop 19.

The housing 3 beyond the nest has an exit door 20 which is hinged to the wall 11 of the nest. The free end of the exit door is hooked to the rear wall 21 by a spring-actuated latch 23 secured to the rear wall and engaging a hook 24 carried by the exit door. The biased end 25 of a slide 26 is maintained clear of the spring-actuated latch 23 by a spring 27, which spring brings the other end of the slide out of the front opening in the housing when the door is in position shown in full line in Fig. 1 (see dotted line of the slide in Fig. 2). The closing of the entrance door 4 by gravity brings the same against the end of the slide 26 projecting therethrough. Due to the acquired velocity, the impact of the entrance door forces the slide 26 against the resistance of the spring 27 bringing the biased end 25 of the slide against the spring-actuated latch, causing the same to disengage the hook. The exit door 20 being unlocked is free to swing under the action of gravity. The swinging movement is limited by a flexible member 28 which connects the entrance door 4 above its pivotal axis to the exit door 20 adjacent the free end, the entrance door 4 overbalancing the exit door 20. A guiding pulley 29 is provided for said flexible member on the side of the housing.

The rear wall at the lower edge has an opening 30 which is not large enough to allow a hen to pass but which will attract the attention of the hen after the entrance door 4 is closed, for the light can enter the housing only through that opening after the said door 4 is closed. The movement of the hen toward said opening will add weight to the exit door 20 and cause the same to swing to the position shown in dotted lines in Fig. 2, thereby sufficiently enlarging the opening 30 to allow the hen to escape. The displacement of the exit door exercises a pull on the flexible member 28 and draws the entrance door 4 to the position indicated in Fig. 2, bringing the notch in the brace 5 into engagement with the stop 6.

To restore the exit door 20 to its normal position a spring 31 is provided. The normal strength of the spring is insufficient to prevent gravity from displacing the hook 24 from the latch 23 after the latch has been operated by the slide. Due to the weight of the hen placed upon the exit door 20 the spring is stressed. In its restitution it overcomes the action of gravity on the trap and brings the hook 24 into engagement with the latch 23, thus automatically locking the exit door. The nest is thereby again reset. The nest 8 has preferably an additional side wall 32 which forms a guard for the trip, link, and the spring located at that side of the nest. The top of the housing has preferably a hinged section 33 wherethrough access may be had to the interior of the housing for the purpose of inspection, repair and cleaning.

From the above description it will be noted that unless the hen deposits an egg she cannot pass through the opening 30, for the exit door 20 will remain locked and the only way of escape is back through the entrance opening. As soon as an egg is deposited by a hen the entrance door 4 is closed, the closing of the door releasing the exit door and leaving the only escape for the hen through the rear opening. If the hen steps on the trap but for some reason changes its intention and returns to the nest, the entrance door 4 will swing to its closed position and prevent the exit door from being locked, so that the only escape for the hen is through the exit door. It is clear from the description that the mere entrance of a hen into the nest cannot trap her; she is trapped only after laying an egg. The hen can never eat the deposited egg for it rolls out of the nest as soon as it is deposited. It not only saves the egg but it prevents the hen from acquiring the habit of eating eggs.

We claim:

1. In a hen's nest, a housing having a nest, a gravitationally-operable entrance door, means locking the door in an open position, a baffle operable by the weight of an egg, a trip for operating the locking means of the door to release the same, motion-transmission means from the baffle to the trip, means for directing an egg from the nest to the baffle, a receptacle for receiving the egg from the baffle, a gravitationally-operable exit door, a slide operable by the closing movement of the entrance door, means locking the exit door to the housing operable by the displacement of the slide and releasing the exit door, said housing having an opening in the rear wall at the exit door, a flexible member connecting the entrance door to the exit door, said flexible member allowing to said exit door a limited movement after the same has been unlocked, said exit door adapted to be displaced by the additional weight of a hen passing thereover, whereby said entrance door is swung to the open position, and a spring connected to the exit door and adapted to be stressed by the displacement of the exit door, the restitution of the spring bringing the exit door to its normal position.

2. In a hen's nest, a housing having a nest the bottom of which is inclined to allow an egg to roll off therefrom, a swinging baffle adapted to receive the egg and to be displaced thereby, a receptacle for receiving the egg from the baffle, a gravitationally-operable entrance door, means locking the door in the open position, means for unlocking the entrance door connected to the baffle and operable by the displacement thereof, a gravitationally-operable exit door, means locking the exit door in the closed position, means for unlocking the exit door operable by the closing movement of the entrance door, a flexible member connecting the entrance door to the exit door, said flexible member limiting the movement of the exit door, said flexible member adapted to swing the entrance door to its open position when the weight of a hen is added to the exit door, and a spring adapted to be stressed by the additional weight of the hen on the exit door for restoring the exit door to its normal position.

3. In a hen's nest, a housing having a nest the bottom of which is inclined to allow an egg to roll therefrom, a receptacle for eggs, a swinging baffle plate adapted to receive the egg coming from the nest and direct the same into the receptacle, a gravitationally-operable entrance door, means locking the entrance door in the open position, means for unlocking the entrance door operable by the movement of the baffle under the action of the egg, a gravitationally-operable exit door, means locking the exit door to the housing, means for operating the locking means to release the exit door operable by the closing movement of the entrance door, a flexible member binding the entrance door to the exit door, said flexible member limiting the movement of the exit door under its weight after it has been unlocked, additional weight placed on said exit door causing the entrance door to swing to its open position, and means for restoring the exit door to its normal position after it has been relieved of the additional weight.

4. In a hen's nest, a housing having a nest the bottom of which is inclined to allow an egg to roll off, a receptacle for receiving the eggs coming from the nest, a swinging baffle interposed between the bottom of the nest and the receptacle to direct the egg coming from the nest into the receptacle, said baffle adapted to be displaced by the weight of the egg falling upon the baffle, a gravitationally-operable entrance door, means locking the door in the open position, motion-transmission means from the baffle to the locking means of the entrance door for unlocking the door when the baffle is displaced, a gravitationally-operable exit door, means locking the exit door in closed position, means for unlocking the exit door operable by the closing of the entrance door, means connecting the entrance door to the exit door for transmitting the movement of the exit door to the entrance door and whereby the entrance door is restored to its open position, and means for restoring the exit door to its closed position.

5. In a hen's nest, a gravitationally-operable entrance door, means for locking the door automatically in the open position, means operable by the weight of an egg for actuating the locking means to unlock the door, a normally locked, gravitationally-operable exit door, means for unlocking the exit door operable by the closing of the entrance door, means connecting the exit door to the entrance door limiting the displacement of the exit door after it has been unlocked, said exit door being adapted to be further displaced from its locked position by the additional weight of a hen whereby the entrance door is restored to its normal position, and means for restoring the exit door to its closed position.

6. In a hen's nest, a gravitationally-operable entrance door, a gravitationally-operable exit door, means locking the entrance door automatically at the open position thereof, means locking the exit door automatically at the closed position, means operable by the weight of an egg for actuating the locking means of the entrance door whereby the door is allowed to move under the action of gravity, means for unlocking the trap operable by the closing of the entrance door, means connecting the exit door to the entrance door whereby the motion of the exit door is transmitted to the entrance door and whereby said entrance door is restored to its open position, and a yielding member for restoring the exit door to its normal position becoming operable after a predetermined displacement of said exit door.

7. In a hen's nest, a gravitationally-operable entrance door, means for automatically locking the door in the open position, means for operating the locking means to release the entrance door operable by an egg deposited in the nest, a gravitationally-operable exit door, means locking the exit door in the closed position, means for unlocking the exit door operable by the closing of the entrance door, motion-transmission means from the exit door to the entrance door for restoring the entrance door to its open position, and means for restoring the exit door to its closed position.

8. In a hen's nest, a housing having a nest, a gravitationally-operable door at the entrance to the nest, a brace pivotally connected to the door, a stop for engaging the brace, a trip for raising the brace from the stop, a baffle operable by the weight of an egg, motion-transmission means from the baffle to the trip, a normally closed exit door, means for locking the exit door operated by the closing of the entrance door, motion-transmission means from the exit door to the entrance door, and means for restoring the exit door to its normal position.

9. In a hen's nest, a housing having a nest, a gravitationally-operable entrance door for the entrance to the nest, means for locking the entrance door automatically in the open position, a baffle operable by the weight of an egg, a trip for operating the locking means, a link connecting the trip to the baffle, means for restoring the baffle to its normal position, a normally locked gravitationally-operable exit door, means for unlocking the exit door operable by the closing of the entrance door, motion-transmission means from the exit door to the entrance door, and means for restoring the exit door to its closed position.

10. In a hen's nest, a gravitationally-operable entrance door, means for automatically locking the door in open position, means for operating the locking means to release the entrance door operable by an egg deposited in the nest, an exit door, means for locking the exit door, a slide extending from the locking means of the exit door to the entrance, a yielding member for moving the slide to the entrance to bring the said slide into the path of the entrance door, motion-transmission means from the exit door to the entrance door, and mean for restoring the exit door to its normal position.

FREDERICK S. SPENCER.
FERDINAND J. R. LENTZSCH.

Copies of this patent may be obtained for five cents each, by addressing the "Commissioner of Patents, Washington, D. C."